Oct. 6, 1936.  K. L. HAYDEN  2,056,188
AIRCRAFT WING CONSTRUCTION
Filed Aug. 17, 1934  4 Sheets-Sheet 3
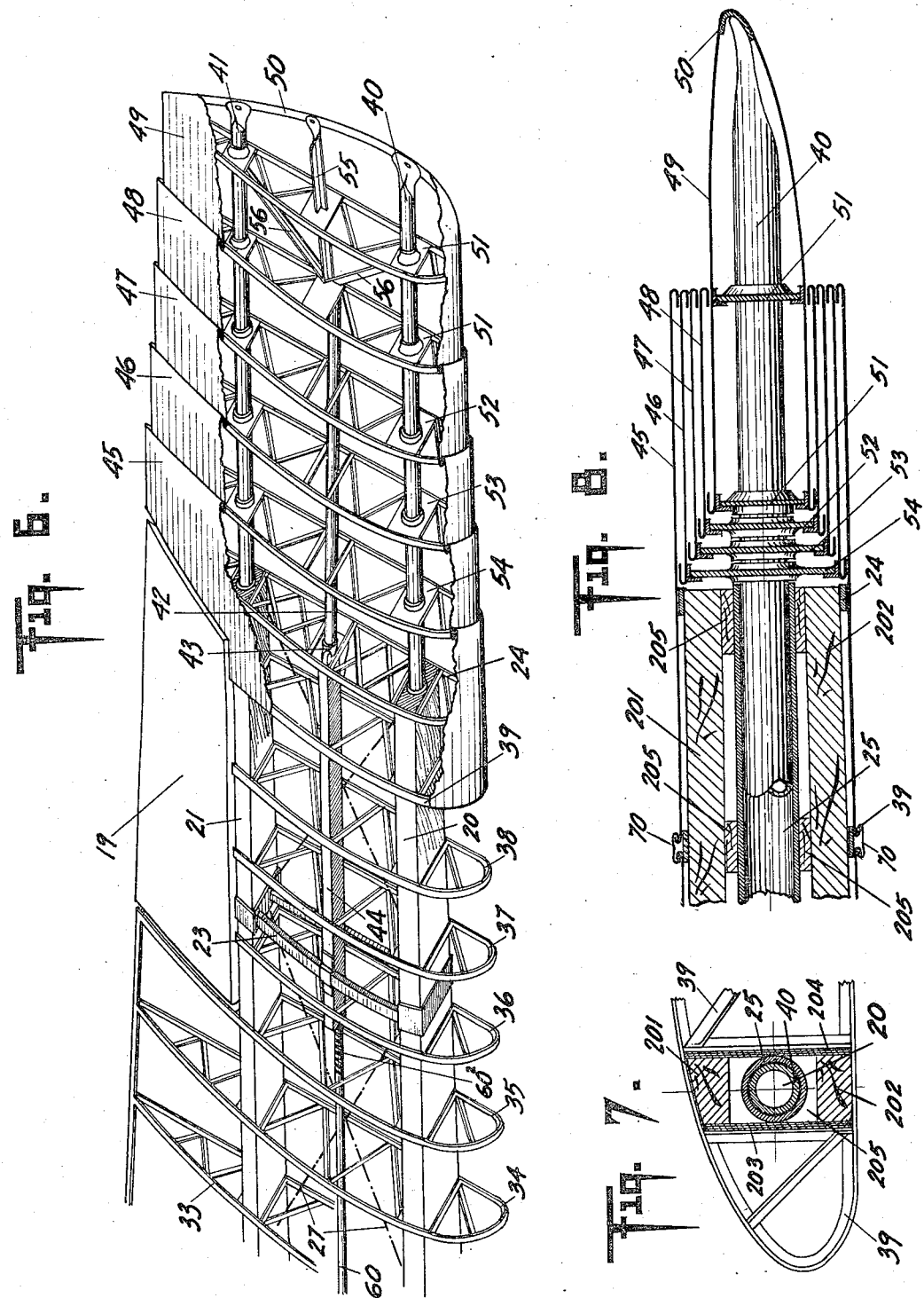
WITNESSES
INVENTOR
Kenneth L. Hayden.

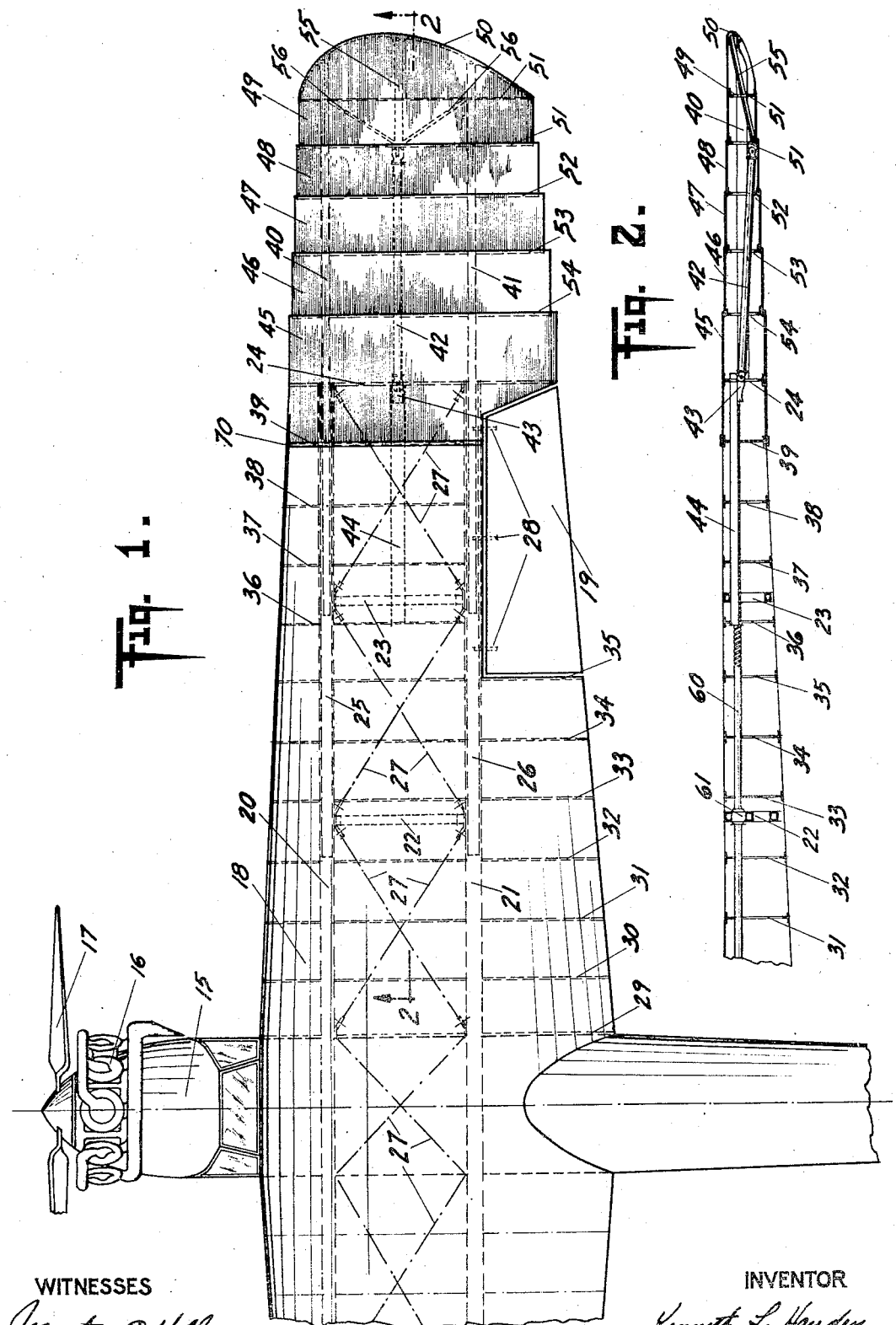

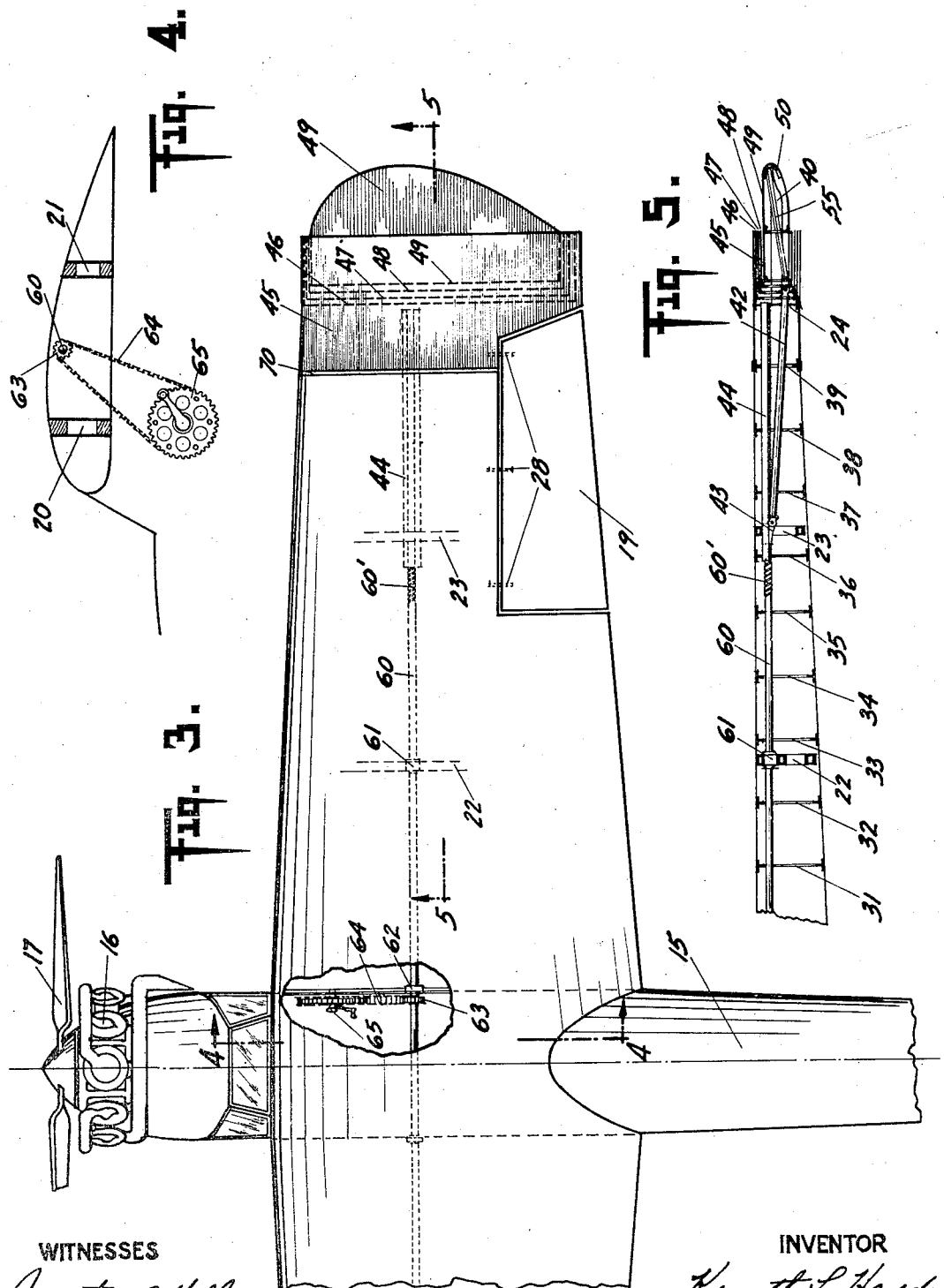

Oct. 6, 1936.　　　　K. L. HAYDEN　　　　2,056,188
AIRCRAFT WING CONSTRUCTION
Filed Aug. 17, 1934　　　　4 Sheets-Sheet 4
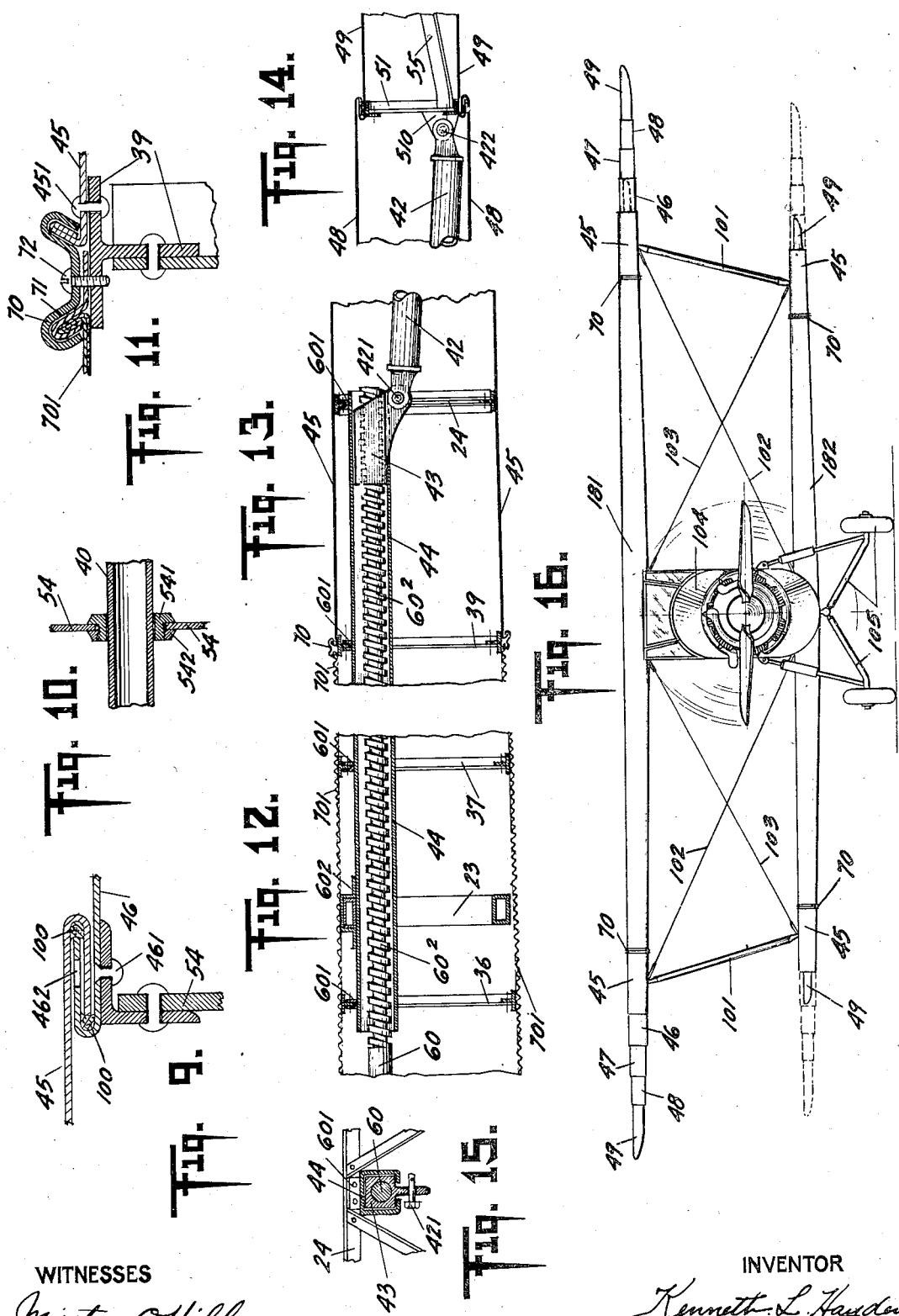
WITNESSES
INVENTOR
Kenneth L. Hayden.

Patented Oct. 6, 1936

2,056,188

UNITED STATES PATENT OFFICE 2,056,188

AIRCRAFT WING CONSTRUCTION

Kenneth L. Hayden, Winthrop, Mass.

Application August 17, 1934, Serial No. 740,221

18 Claims. (Cl. 244—12)

This invention relates to wings for aircraft, and more particularly to an extensible, retractable wing structure that has for its object, means to provide variable wing areas for various conditions of flight.

In the design of aircraft, it has been found that the maximum speed of a given airplane in flight, bears a definite relation to its minimum or landing speed and; although the ratio between maximum speed and landing speed has been measurably increased, due to more efficient design, by eliminating all unnecessary parasitic resistances, such as the painstaking stream-lining of all projecting parasitic obstructions, and the elimination of landing-gear resistances by the use of retractable landing-gear, etc; it is realized that the maximum flying speed of a given design could be substantially increased, by increasing the power output, except that the proportional increase in the landing speed of such a design, due to the increased weight of the power plant requiring increased wing loading per square foot of area; becomes excessive and possibly hazardous under all practical flying conditions.

However, as is generally known to those skilled in the art; aircraft require less wing area to sustain themselves in flight, than is required for either taking-off or landing purposes; as the gain in speed of aircraft after they are launched into air, materially increases the wing loading per square foot of area, and thereby inversely requires less wing area to sustain a given load.

It is also a commonly accepted principle in airplane design; that the conserving of a pound of forward thrust or propeller thrust is equivalent to conserving approximately ten pounds of lift. Likewise it is of primary importance to eliminate all unnecessary aerodynamic resistances retarding this forward thrust, as such an accomplishment will automatically increase the maximum speed available with equal power output, thereby increasing the wing loading per square foot of area; which will inversely require a smaller wing area to sustain such a design in flight. It is therefore of much greater concern in the design of an efficient wing, to decrease the aerodynamic resistances re-acting upon such a wing, than it is to save a few pounds of weight in the structure of the wing itself.

In view of the above considerations governing the design of aircraft, a wing so devised as to offer sufficient wing area for normal landing and taking-off requirements within conventional speed ranges, but which will also offer a substantially reduced wing area in flight, and thereby reduced aerodynamic resistance as well, will contribute materially to an increased maximum speed performance of such a design, increasing also the ratio between the minimum speed range and the maximum speed range of a given design, and contributing materially to the general performance characteristics of such aircraft thereby.

A feature of the invention is to devise a wing structure of sufficient area for normal taking-off and landing requirements within conventional speed ranges, but in addition thereto, to provide such a wing structure with retractable or collapsible wing tips, for the purpose of reducing the wing's area in flight, and thereby materially reducing the aerodynamic resistance re-acting thereon, so as to substantially increase the maximum speed range available, with equal power output, over that of conventional wing structures.

Another feature of the invention is to provide a retractable wing structure adaptable to either the so-called monoplane wing construction of either externally braced, or cantilever construction, or to a multi-plane wing structure comprising two or more wings mutually reinforced by external bracing such as struts, stays, wires, and the like.

Another feature of the invention is to devise a retractable wing structure adaptable to either wood and fabric wing construction, or to metal wing construction, or to a combination of both constructions.

Another feature comprises the provision of a practical structure of the character described which, while possessing the desired aerodynamic characteristics, is capable of withstanding the various stresses to which the wing is subjected, with a minimum of weight. To this end each service to be performed by the structural elements of the wing itself, is placed whenever possible, upon some member which is already present for some other consistent purpose. In this way the maximum value of all the material is obtained, a matter of especial moment when a maximum of lightness and strength are required.

Another feature of the invention is to provide a retractable wing structure of the character described, which will not be rendered inoperative by atmospheric ice formations which may be encountered in flight.

Other novel features of the invention will become apparent from the detailed description hereinafter given, which is illustrated in the accompanying drawings forming a part of this application. It is to be clearly understood however, that the wing structures shown and described constitutes but one embodiment of my invention or inventions, and is not to be taken as definite or for any other purpose than that of illustration. It is obvious that my invention and its various features may be embodied in various forms and constructions, and my invention is to be understood as limited only to such features and structures as are clearly defined in the appended claims.

In the drawings similar reference characters refer to similar parts in all of the views of which, Figure 1 is a fragmentary plan view of a monoplane wing structure, with the invention which is the subject matter of this application applied thereto, illustrating the collapsible portions of the wing in fully extended position, but however having a portion of its operating mechanism omitted, to clarify the illustration.

Figure 2 is a longitudinal section taken on the line 2—2 of Figure 1.

Figure 3 is a fragmentary plan view of the monoplane wing structure, illustrating the collapsible portions of the wing in fully retracted position, also illustrating the control mechanism for actuating the collapsible portions of the wing to extended or retracted positions.

Figure 4 is a cross sectional view taken on the line 4—4 of Figure 3.

Figure 5 is a longitudinal section taken on the line 5—5 of Figure 3.

Figure 6 is a fragmentary isometric view of the monoplane wing structure illustrating the collapsible portions in extended position.

Figure 7 is a cross sectional detail view, illustrating one form of front wing spar construction.

Figure 8 is a fragmentary longitudinal section taken at the front wing spar, illustrating in detail the collapsible portions of the wing in retracted position.

Figure 9 is a fragmentary sectional view taken at rib 54 of Figure 6, illustrating in detail the interlocking U flanges of the telescopic sections, when in extended position.

Figure 10 is a fragmentary sectional view taken at rib 54 of Figure 6, illustrating in detail the method of slidable rib support.

Figure 11 is a sectional view of a wing joint covering band, illustrating in detail one method of fabric and metal covering connection.

Figure 12 is an enlarged sectional view taken at the center of strut 23 of Figure 2, illustrating in detail the method of support of the control shaft, for actuating the collapsible portions of the wing.

Figure 13 is an enlarged sectional view taken at the centers of ribs 39 and 24 of Figure 2, illustrating in detail the control shaft, control shoe, and control strut assembly.

Figure 14 is an enlarged sectional view taken at the center of inner rib 51 of Figure 2, illustrating in detail the method of control strut attachment to rib 51.

Figure 15 is a cross secional view of the control shoe assembly illustrated in Figure 13.

Figure 16 is a front view of a conventional biplane wing structure, with the invention which is the subject matter of this application applied thereto, illustrating the upper wing with collapsible portions fully extended, and the lower wing with collapsible portions fully retracted.

The wing structure illustrated in the drawings and hereinafter described anticipates the use of a combined wood, fabric and metal structure as this form is believed to be the most illustrative to describe, but it is readily apparent to those skilled in the art, that an all-metal structure may embody the invention in like form. Also the various rib elements 29, 30, 31, 32, 33, 34, 35, 36, 37, 38, and 39 may be of conventional wood rib constructon instead of that shown, and likewise the spar elements 20 and 21 may be of tubular, or built-up metal construction instead of that described, and the main portion of the wing proper may be covered with metal instead of the fabric covering illustrated, or any logical combination of the above named materials may be used as required for the particular wing structure desired.

It will be noted that the ailerons 19 are graphically indicated in the drawings as, being of the usual conventional design, old in the art, and well known in structure and methods of operation to those skilled in the art, they are therefore simply indicated, and the details of structure and operation are omitted, so as to clarify the elements of the wing structure which are a part of the invention hereinafter described.

By referring to the drawings it will be seen that the fuselage 15, provided with a power unit or engine 16 including its propeller 17 is rigidly secured to the monoplane wing 18 in accordance with conventional practice. This wing 18 of internally braced cantilever construction embodies a positive raked leading edge and a negative raked trailing edge, with gradually diminishing aerofoil section from the center of the wing outward toward each wing tip. The top surface of the wing at its highest point is substantially a straight line from wing tip to wing tip, while the under surface of the wing and the leading edge and trailing edge slant upward from opposite sides of the fuselage towards the wing tips. This construction enables the wing to have a transversely flat top surface, for materially aiding the compressive strength of the supporting spars, but in addition thereto, secures a sufficient dihedral angle to the under surface of the wing to materially improve the inherent lateral stability thereof.

The wing proper 18 is constructed of the usual built-up spar members 20 and 21, upon which are spaced the wing ribs 30, 31, 32, 33, 34, 35, 36, 37, 38, and 39, and the compression ribs 29 and 24, all of gradually diminishing aerofoil section from wing root to wing end, to give the desired form to the wing; with the compression struts 22 and 23 introduced between the spar members 20 and 21, to divide the wing into equal panels, and the truss wires 27 secured thereto, to form the usual drag truss construction consistent with conventional practice. Also secured to the rear spar member 21 with the necessary hinged fittings 28, is the aileron 19 of conventional design and operation as previously described. The front spar member 20 and the rear spar member 21 of conventional built-up spar construction are provided with the compression members 201 and the tension members 202, secured by the side plates 203 and 204, except that within these main spar members 20 and 21 are introduced primary tubular spars 25 and 26, rigidly secured therein and properly aligned and positioned by the shim blocks 205. These primary spars 25 and 26, extending from the ends of the wing proper inwardly to ribs 32, serve the two-fold purpose of contributing additional stiffness and rigidity to the main supporting spars 20 and 21, but in addition thereto serve as sleeve guide supports for the secondary slidable tubular spar members 40 and 41, which are inclosed within the primary spars 25 and 26, and telescopically related thereto.

At each end of the main wing structure at ribs 39 and 24, a metal covering or fixed exterior section 45 is applied, to form the top and bottom surfaces of the wing, and is rigidly secured to ribs 39 and 24 by the rivets 451 (Figure 11), or similar securing means, with the section 45 extending laterally outward sufficient to inclose the movable telescopic sections 46, 47, 48 and the major portion of movable telescopic tip section 49, as illustrated in Figure 8 of the drawings. The outer end of covering or fixed exterior section 45 is provided with an internally bent U flange and the inner end of section 45 is provided with an external angular flange at rib 39; where the fabric covering 701 terminates in pressed connection with the metal flange plate 71, if a fabric covering is desired for the wing proper, and a metal channel member 70 engaging the fabric connection 71 with the angular flange of section 45, and secured to rib 39 by the machine screws 72, forms a wing joint covering band 70 between the juncture of the fabric 701 and covering or fixed exterior section 45. If an all-metal wing covering is preferred, the wing joint covering band 70 may be omitted and the metal cover or fixed exterior section 45 may be continued over the balance of the wing proper with the necessary butt joints or overlapping joints required, omitting the external angular flange thereof, at rib 39.

The movable telescopic section 46 comprises the supporting rib 54, engaged with and rigidly secured to the inner end of the metal cover 46, which has provided at its inner end an externally bent U flange, and at its outer end an internally bent U flange. The rib 54 is provided with the two sleeves 541 threadably secured thereto by the lock rings 542, (Figure 10) and so positioned as to permit slidable movement laterally of the assembly 46 on the secondary spars 40 and 41.

The movable telescopic section 47 comprises the supporting rib 53, engaged with and rigidly secured to the inner end of the metal cover 47, which is likewise provided at its inner end with an externally bent U flange, and at its outer end an internally bent U flange. The rib 53 is likewise provided with two sleeves similar in application to sleeves 541 and secured in like manner, and so positioned as to permit slidable movement laterally of the assembly 47 on the secondary spars 40 and 41.

The movable telescopic section 48 comprises the supporting rib 52, engaged with and rigidly secured to the inner end of the metal cover 48, which is likewise provided at its inner end with an externally bent U flange, and at its outer end an internally bent U flange. The rib 52 is likewise provided with two sleeves similar in application to sleeves 541 and secured in like manner, and so positioned as to permit slidable movement laterally of the assembly 48 on the secondary spars 40 and 41.

The telescopic terminate or movable tip section 49 comprises the two supporting ribs 51 engaged with and rigidly secured to the metal cover 49, which has provided at its inner end an externally bent U flange, and at its outer end the trailing edge 50, securely fastened thereto and to the outer ends of the secondary spars 40 and 41. The supporting ribs 51 likewise are rigidly secured to the secondary spars 40 and 41 and are cross-braced by the two diagonal struts 56 and the stiffener strut 55, to form a rigid cross-braced structure; effective for slidable movement laterally of the assembly 49 and the secondary spars 40 and 41 as a complete self-contained unit.

The externally bent U flanges and the internally bent U flanges of sections 45, 46, 47, 48, and 49 are continuous throughout the periphery of the wing, with the exception of their juncture at the trailing edges thereof, where they are there omitted. Each extensible section progressively reduces its peripheral dimension sufficient to permit slidable movement thereof within the outer internally bent U flange of its adjacent covering section. That is, the telescopic or movable sections 46, 47, 48 and the major portion of section 49 nest in telescopic relation within the fixed exterior section 45, when the wing tips are in a retracted position. Section 46 nests in telescopic relation within section 45, section 47 nests in telescopic relation within section 46, section 48 nests in telescopic relation within section 47, and the major portion of section 49 nests in telescopic relation within section 48, as illustrated in Figure 8 of the drawings. It will be seen that outer supporting rib 51 of section 49 and the outer internally bent U flanges of sections 45, 46, 47, and 48 superimpose to form an aligned compression rib when the extensible wing tip portions are in retracted position, for the purpose of receiving the aerodynamic stresses imposed upon the outer end of the covering or fixed exterior section 45 in flight.

The externally bent U flanges, and the internally bent U flanges of sections 45, 46, 47, 48, and 49 may be provided with the resilient cushions 100 continuous throughout the periphery of their U flanges (Figure 9), such as rubber or the like, for the purpose of absorbing any variations in the edges of the various flanges, and to effect a weather seal to the interlocking joints as well.

Upon actuating the extensible wing tip portions into extended position, movable tip section 49 slides outwardly with its secondary spars 40 and 41 until its inner externally bent U flange interlocks with the outer internally bent U flange of section 48. Section 49 in turn carrying outwardly section 48 until the inner externally bent U flange of section 48 interlocks with the outer internally bent U flange of section 47. Section 48 in turn carrying outwardly section 47 until the inner externally bent U flange of section 47 interlocks with the outer internally bent U flange of section 46. Section 47 in turn carrying outwardly section 46 until the inner externally bent U flange of section 46 interlocks with the outer internally bent U flange of the fixed exterior section 45. Section 45 in turn arresting further outward movement of movable sections 46, 47, 48, and 49 effecting full extension of the collapsible extensible wing tip portions thereby.

By referring to Figures 2 and 6 of the drawings, it will be seen that the fixed exterior section 45, together with the movable sections 46, 47, 48, and 49 when in extended position, with their respective U flanges interlocked, position their supporting ribs 54, 53, 52, and 51 at the outer ends of their adjacent enclosing sections respectively, supporting the outer ends of these adjacent sections thereby; for the purpose of resisting external pressures applied to the surfaces of the collapsible, extensible wing tip portions. The interlocking of the U flanges likewise secures these surfaces against separation or distortion outwardly.

Upon actuating the extensible wing tips into retracted position, movable section 49 slides inwardly with its secondary spars 40 and 41 until its inner supporting rib 51 abuts rib 52 of section 48, carrying inwardly section 48 until its rib 52 abuts rib 53 of section 47, carrying inwardly section 47 until its rib 53 abuts rib 54 of section 46, carrying inwardly section 46 until its rib 54 abuts the fixed tubular spar members 25 and 26, which in turn arrests further inward movement of the movable sections 46, 47, 48, and 49, effecting full retraction of the collapsible, extensible wing tip portions thereby.

The mechanism for actuating the telescopic or movable sections 46, 47, 48, and 49 into extended and retracted position, comprises a control strut 42, secured at its outer end by the clevis pin 422 to the gusset plate 510, which is in turn secured to the inner supporting rib 51 of section 49 at the juncture of stiffener strut 55. The inner end of the control strut 42 is secured to the slidable control shoe 43 by the clevis pin 421. This control shoe 43 is contained within and supported by the track guide 44, so as to permit limited lateral movement thereof, but secured against vertical and sidewise movement. A control shaft 60, introduced within the track guide 44, and extending throughout the lateral length of the wing proper from right wing end to left wing end, terminating at compression rib 24 in each case, is provided with reversely threaded ends comprising a right-handed thread $60^1$ and a left-handed thread $60^2$ respectively, for screw thread engagement with the control shoes 43, whereby rotation of the control shaft 60 in a clockwise direction retracts the slidable control shoes 43, and likewise the movable sections 46, 47, 48, and 49, and counter-clockwise rotation extends the slidable control shoes 43, and likewise the movable sections 46, 47, 48, and 49. The track guide 44, rigidly secured to the top members of the ribs 24, 39, 38, 37, and 36 by the clip connections 601, is also strengthened and secured against lateral movement; and more particularly to take the upward thrust of the control strut 42, by a clip connection 602, fastened to the compression strut 23. The control shaft 60 however is supported throughout its semi-span length by a thrust bearing support 61 positioned at the compression strut 22, and another thrust bearing support 62 positioned at the compression rib 29. Within the central portion of the wing proper on control shaft 60, the sprocket wheel 63 is secured and, supported on the inside of the fuselage 15 within the operator's compartment, the manually operated sprocket wheel 65 is provided, with the chain drive 64 connecting sprocket wheels 63 and 65 for transmitting rotary movement to the control shaft 60, and thereby actuate the collapsible, extensible wing tip portions into extended or retracted position simultaneously.

With reference to the control mechanism it is thought advisable, for a more complete understanding of the collapsible, extensible structure; to consider some of the stresses involved when the wing is in an extended position, and the structural provisions that have been devised for absorbing these stresses. It will be noticed by referring to Figure 2 of the drawings, that the control strut 42 is placed in angular relation to the secondary spars 40 and 41, that is, its innermost point of application is above the center line of the secondary spars, and its outermost point of application is below the center line thereof. This is of particular importance to the collapsible, extensible structure, when considering the stresses acting thereupon, as it affords a triangulation of such stresses, by applying a point of additional support near the ends of the wing, extensible wing tip portions. In considering wing structure in a condition of rest, or at the conclusion of a landing, a structure of sufficient rigidity to withstand approximately little more than its own weight is required (downward thrust), which is amply supplied by the resistance to bending and shear of the secondary spars 40 and 41, but in addition thereto, the control strut 42, disposed in angular relation therewith, and acting in tension through the control shaft 60, applies a point of additional support to the center of the inner supporting rib 51. However, the wing in a condition of flight not only requires a reverse loading on the wing (upward thrust), but has a materially increased wing loading as well, and in addition requires such a collapsible structure to resist the drag resistance of the wing itself. The movable tip section 49 of rigid cross-braced construction, due to struts 55 and 56 and the metal skin 49, is of sufficient strength to resist all warp, twist, and torsional stresses of the wing tip. The secondary spars 40 and 41 supported at the end of the wing proper at rib 24 by the primary tubular spars 25 and 26, supply sufficient strength to resist bending and shear of the spars 40 and 41, as they are mutually reinforced by the control strut 42 disposed in angular relation thereto, and now acting in compression through the control shaft 60 and the track guide 44, applying a point of additional support to the center of the inner supporting rib 51 thereby, when the control strut 42 is extended to the limit of movement permitted by the interlocking sections 45, 46, 47, 48, and 49. This interlocking of the telescopic sections under the pressure exerted by the control rod 42 likewise reducing to a minimum the tendency of the wing tips to warp, twist, or distort, due to the tensional stress placed upon the telescopic sections by the control rod, preventing any possibility of wing flutter thereby.

Although the extensible wing construction heretofore described, is adapted to a monoplane wing structure, such an extensible wing structure may be equally adaptable to a multiplane wing structure comprising two or more wings mutually reinforced by external bracing, such as struts, stays, wires, and the like. Figure 16 of the drawings illustrates the invention which is the subject matter of this application applied to a conventional biplane structure, where the conventional fuselage 104, supported by a landing gear 105, is provided with the upper wing 181, and the lower wing 182, each securely fastened to the fuselage 104 by the usual conventional attachments, fittings, and the like. Interpoised between the wings 181 and 182 at the center of fixed exterior sections 45, is provided the usual interplane struts 101, and, cross-braced from the bottom of wing 181 at the struts 101 to the attachment of wing 182 at the sides of the fuselage 104, are the flying wires 102. Likewise cross braced from the top of wing 182 at the struts 101 to the attachment of wing 181 at the sides of the fuselage 104, are the landing wires 103. Additionally, the usual drift and drag wires may be provided consistent with conventional practice. The wings 181 and 182 however are provided with the collapsible wing tips heretofore described, of like construction and operation, comprising the fixed exterior sections 45, and the telescopic or movable sections 46, 47, 48, and 49 disposed at the ends of the wings thereof. Figure 16 of the drawings illustrates the collapsible wing tips of wing 181 in extended position, the dotted lines of which indicate the limit of the wing tips in retracted position; and the collapsible wing tips of wing 182 in retracted position, the dotted lines of which indicate the limit of the wing tips in extended position.

It will be noticed that the construction of the fixed exterior sections 45 permits the application of the necessary strut fittings on the spar members 20 and 21 at compression ribs 24, for receiving the interplane struts 101 without interfering in any way with any portion of the retractable sections 46, 47, 48, and 49, or their operation.

The control mechanism for actuating the collapsible wing tips of wings 181 and 182 may be inter-connected by suitable sprocket wheels 63, secured to the control shafts 60, and inter-engaged by a similar chain drive 64, so that both wings may be extended or retracted simultaneously by the manually operated sprocket wheel 65. However each wing may be actuated independently of the other, by similar manually operated drive and sprocket wheel mechanism as that used in the monoplane wing structure previously described, and it is believed preferable to extend or retract the extensible wing tip portions of each wing independent of that of the other wing, as by this arrangement, various conditions of wing loading are made available for various flight requirements.

Although the method of operating the control shaft 60 for the purpose of actuating the collapsible wing tips into retracted and extended position utilizes a manually operated sprocket wheel 65 and chain driven mechanism 64, it is readily apparent to those skilled in the art, that electromotive means may be utilized for rotating the control shafts 60, such as an electric motor engaged with the control shafts 60 by chain driven, or gear driven means, and having the necessary stop limit contacts provided, to prevent over-actuation of the wing tips in either extended or retracted position.

With respect to the metal portions of the wing structures described, a light metal of high tensile as well as compressive strength, particularly when fabricated into the various sheets and shapes required, should be selected, such as aluminum and its alloys, particularly the alloy commercially known as duralumin, having been found eminently satisfactory for the purpose. In those particular elements of the structure requiring a maximum of tensile as well as compressive strength, such as the primary and secondary spar elements, and possibly a portion or portions of the control mechanism as well, a chrome molybdenum steel may be used.

The method of fabrication and assembly of the telescopic sections is as follows; the metal covers or skins 45, 46, 47, 48, and 49 are formed into the desired aerofoil sections by the usual conventional stamping process, or shaped in the necessary forms as desired, and comprise a continuous piece throughout the perimeter of the aerofoil section, terminating in a flush wedge shaped joint at the trailing edge thereof, and secured by welding means or counter-sunk riveting means as desired. In assembling the collapsible structure, the telescopic section 49 is assembled complete including its supporting ribs 51, trailing edge 50, struts 55 and 56, secondary spar elements 40 and 41, and the skin 49. The metal skin of section 48 is then applied to the outer end of section 49 and pulled inwardly over section 49 until the U flange thereof interlocks with the U flange of section 49. The supporting rib 52 of section 48 is then positioned upon the spar elements 40 and 41 by the slidable sleeves 541 and pulled outwardly along spars 40 and 41 until it engages and aligns with the inner end of skin 48. The rib 52 is then rigidly secured to skin 48 by countersunk rivets 461, similar in application to that of rib 54 of section 46 illustrated in Figure 9 of the drawings. It will be noticed that the inner externally bent U flanges are provided on their external flange faces with the drilled openings 462, to permit insertion of the rivets 461 for assembling the various sections. Likewise the metal skin 47 is applied to the outer end of section 49 and pulled inwardly over sections 49 and 48 until the U flange thereof interlocks with the U flange of section 48. Rib 53 of section 47 is then positioned upon spar elements 40 and 41 by the slidable sleeves 541 and pulled outwardly along these spars until it engages and aligns with the inner end of skin 47. The rib 53 is then rigidly secured to skin 47 by the aforesaid riveting means. Also metal skin 46 is applied to the outer end of section 49 and pulled inwardly over sections 49, 48, and 47 until the U flange thereof interlocks with the U flange of section 47. Rib 54 of section 46 is then positioned upon spar elements 40 and 41 by the slidable sleeves 541 and pulled outwardly along these supporting spars until it engages and aligns with the inner end of skin 46. Rib 54 is then rigidly secured to skin 46 by aforesaid riveting means. The secondary spar elements 40 and 41 of section 49 are then inserted within the primary supporting spars 25 and 26, and the control mechanism assembled and adjusted with the telescopic sections 46, 47, 48, and 49 nested in retracted position. The fixed exterior section 45 is then applied to the outer end of section 49 and pulled inwardly over the nested sections 49, 48, 47, and 46 to proper position relative to the supporting ribs 24 and 39, whereupon it is rigidly secured to the supporting ribs 24 and 39 by the rivets 451, as illustrated in Figure 11 of the drawings. When a damaged collapsible wing tip is to be replaced or repaired, it is only necessary to remove the securing means of fixed exterior section 45, (in this case rivets 451) slide section 45 outwardly and remove clevis pin 421 of the control mechanism, thereby releasing the complete collapsible wing tip assembly in a unit and effecting expedient replacement or repair thereof without disturbing any other portions of the wing structure.

With further reference to the inter-locking telescopic sections 46, 47, 48 and 49, it may be seen by referring to Figure 8 of the drawings, that the telescopic sections when in retracted position during flight, are enclosed by the fixed exterior section 45, except for the minor portion of section 49 which extends outwardly therefrom; forming a shoulder on section 49 of the superimposed U flanges of sections 45, 46, 47, and 48. If during the progress of flight, atmospheric conditions are encountered causing ice formations to collect on the wing structure, such ice formations are limited; with respect to the actuation of the telescopic sections, to the aforesaid shoulder, and do not render the telescopic sections incapable of extension for the purpose of landing, as the actuation of the control mechanism extends outwardly each telescopic section individually, and, by the screw actuated leverage exerted on the section to be extended, forces apart the ice formation adhering thereto and to the outer edge of its adjacent enclosing section. It is evident that ice formations adhering to the outer edges of the telescopic sections are effectively broken up by the tensional strain exerted by the screw actuated leverage of the control mechanism.

Although the form of the invention initially described has provided a retractable wing structure with collapsible wing tips of four enclosed sections 46, 47, 48, and 49 nested in telescopic relation, approximating in this form a 20% reduction in total wing area when in a retracted position, it is evident that a greater or a lesser number of enclosed telescopic sections, similar in application and construction to that initially described, may be provided for the collapsible wing tips, in accordance with the structural limitations of the wing structure itself, and may approximate as little as 5% reduction, or as much as 40% or more reduction in wing area when in retracted position, depending upon the particular performance requirements desired.

It will also be seen that the fixed spar elements 25 and 26, and the slidable spar elements 40 and 41 in telescopic relation therewith, are formed of tubular members cylindrical in form. It is evident however that similar tubular spar members rectangular in form and likewise telescopically related, may be effectively substituted for the fixed spars 25 and 26, and the slidable spars 40 and 41, or other equally adaptable forms may be utilized, performing like functions and effecting similar results as those of the initial form described, in a manner that will be readily apparent to those skilled in the art, without necessitating a detailed description thereof.

For multi-motored aircraft requiring wing structures of large span, where greater strength is required at the retractable portions of the wing structure, it is obvious that a dual control-shaft mechanism may be employed comprising two control struts 42, together with their track guides 44, control shoes 43, and control shafts 60, all positioned in similar relation each to the other, as the control mechanism previously described, but positioned adjacent to the spar members 40 and 41, and within the outer drag truss bay between compression rib 24 and compression strut 23, with the control struts 42 placed in similar angular relation to the spars 40 and 41, providing two points of additional support at the inner rib 51 of telescopic section 49, each adjacent to one of the secondary spars 40 and 41 respectively, instead of the one point of additional support provided at the center of inner rib 51 in the initial form of the invention previously described. However in the dual control-shaft mechanism, a synchronizing device, comprising either inter-engaged cogwheel gear and shaft mechanism, or chain driven sprocket wheel mechanism connecting the two control shafts 60 together, must be provided, to permit synchronized rotation of the shafts 60 and equal movement inwardly or outwardly of the control shoes 43 and the control struts 42 thereby.

Likewise in a wing structure requiring a wing fabrication in two or more units, each attached separately to the fuselage proper, instead of a unitary wing fabrication as previously described, it is evident that the control shaft 60 may comprise a plurality of shafts instead of the continuous shaft 60, each extending from the wing end to the wing root, terminating and inter-engaged thereat by suitable cogwheel mechanism, for effecting simultaneous rotation of these control shafts thereby.

The usual rip-panels or access-panels are to be provided on the under surface of the wing structure, and located at predetermined positions, for the purpose of effecting access to the actuated portions of the control mechanism, to facilitate inspection and lubrication of the respective parts thereby, consistent with conventional practice.

The term aircraft as used in this specification will be understood to include any type of heavier-than-air flying craft, whether land plane, sea plane, or amphibian.

The term wings will be understood to include wings with thick or thin aerofoil of any cross section, and of any plan, or camber.

The term wing ends will be understood to mean the termination of the structural portions of the wing proper, that is at the outer ends of the spar elements 20 and 21.

The term collapsible wing tips, or extensible wing tip portions will be understood to include the movable telescopic sections and fixed exterior section.

As there are numerous variations and modifications of the invention described, it is understood that the description given, is of the preferred forms of the invention. I therefore do not wish to be limited to the construction set forth, but desire to avail myself of such variations and modifications as come within the scope of the appended claims:

What is claimed is:—

1. An aircraft multiplane wing structure comprising superimposed wing surfaces having extensible wing tip portions, each of said portions comprising a fixed exterior section and a plurality of movable sections slidably supported and telescopically nestable together within said fixed exterior section, means for preventing complete separation of said fixed and movable sections, and means for extending the extensible wing tip portions of each said wing independently relatively with respect to the extension of the adjacent wing or wings.

2. In a wing for aircraft having hollow longitudinal frame members, extensible wing tip portions, each comprising a fixed exterior section and a plurality of movable sections including a movable tip section, all said movable sections disposed in telescopic relation with respect to said fixed exterior section, cantilever spar elements secured to said tip section, slidably engaging the other sections and disposed in telescopic relation to the said wing frame members, said sections having interfitting reversely bent marginal flanges successively interengaging upon extension of the movable tip sections, control means longitudinally disposed and rotatably secured within said wing together with strut means shiftably engaging said control means, said strut means slidably supported in said wing and secured to said movable tip sections whereby rotation of said control means causes telescopic movement of said extensible wing tip portions.

3. In a wing for aircraft having hollow longitudinal frame members, extensible wing tip portions, each comprising a fixed exterior section and a plurality of movable sections including a movable tip section, all said movable sections disposed in telescopic relation with respect to said fixed exterior section, cantilever spar elements secured to said tip section, slidably engaging the other sections and disposed in telescopic relation to the said wing frame members, said sections having interfitting reversely bent marginal flanges successively interengaging upon extension of the movable tip sections, a control shaft with reversely threaded ends longitudinally disposed and rotatably secured within thrust bearing supports secured in said wing, fixed guides receiving said shaft ends together with slidable shoes carried by said guides which engage said shaft ends, struts connecting said shoes and movable tip sections, and driving mechanism for rotating said control shaft.

4. In a wing for aircraft having hollow longitudinal frame members, extensible wing tip portions, each comprising a fixed exterior section and a plurality of movable sections including a movable tip section, all said movable sections telescopically nestable together within said fixed exterior section, cantilever spar elements secured to said tip section, slidably engaging the other sections and disposed in telescopic relation to the said wing frame members, said sections having telescopic joints interengaging upon extension of the movable tip sections, a control shaft with reversely threaded ends longitudinally disposed and rotatably secured within said wing, fixed guides receiving said shaft ends together with slidable shoes carried therein, engaging said threaded shaft ends, struts connecting said shoes and movable tip sections and disposed in angular relation to the said cantilever spar elements to form trussing members for supporting the outer ends of said spar elements, and driving mechanism engaging said shaft to cause rotation thereof.

5. In a wing for aircraft having hollow longitudinal frame members, extensible wing tip portions, each comprising a fixed exterior section and a plurality of movable sections including a movable tip section, all said movable sections telescopically nestable together within said fixed exterior section, cantilever spar elements secured to said tip section, slidably engaging the other sections and disposed in telescopic relation to the said wing frame members, said sections having telescopic joints interengaging upon extension of the movable tip sections, spaced control shafts with reversely threaded ends longitudinally disposed and rotatably secured within said wing, fixed guides receiving said shaft ends together with slidable shoes carried therein, engaging said threaded shaft ends, struts connecting said shoes and movable tip sections and disposed in angular relation to the said cantilever spar elements, and driving mechanism interengaging said shafts together with electro-motive means for rotating the same.

6. In a wing for aircraft having a fabric covered central portion and metal covered end portions carrying extensible wing tip portions telescopically nestable therein, means for covering and reenforcing the joints occurring at the juncture of adjacent fabric and metal covered portions comprising clamping bands encircling said joints and receiving the ends of adjacent fabric and metal coverings.

7. In a wing for aircraft having a fabric covered central portion and metal covered end portions carrying extensible wing tip portions telescopically nestable therein, means for covering and reenforcing the joints occurring at the juncture of adjacent fabric and metal covered portions comprising continuous bands encircling said joints, said bands having slots provided to receive the ends of adjacent fabric and metal coverings, and tightening means for clinching said bands and coverings together, whereby removal of said bands and release of said metal end and extensible wing tip portions may be effected without derangement of said fabric covered portion.

8. In a wing for aircraft having hollow longitudinal frame members, extensible wing tip portions, each comprising a fixed exterior section and a plurality of movable sections including a movable tip section, all said movable sections disposed in telescopic relation with respect to said fixed exterior section, cantilever spar elements secured to said tip section, slidably engaging the other sections and disposed in telescopic relation to the said wing frame members, said sections being provided with interfitting reversely bent marginal flanges, so arranged that extension of the tip sections will cause the successive extension of the other movable sections.

9. In a wing for aircraft having hollow longitudinal frame members, extensible wing tip portions, each comprising a fixed exterior section and a plurality of movable sections including a movable tip section, all said movable sections disposed in telescopic relation with respect to said fixed exterior section, cantilever spar elements secured to said tip section, slidably engaging the other sections and disposed in telescopic relation to the said wing frame members, said sections being provided with interfitting reversely bent marginal flanges, so arranged that extension of the tip sections will cause the successive extension of the other movable sections, and means for causing extension of said movable tip sections to effect extension of the other movable sections.

10. In an aircraft wing structure having hollow longitudinal frame members, extensible wing tip portions, each comprising a fixed exterior section and a plurality of movable sections including a movable tip section, all said sections arranged to fit one within another in a graduated series, cantilever spar elements secured to said tip section, slidably engaging the other sections and disposed in telescopic relation to the said wing frame members, said sections having interfitting telescopic joints successively engaging upon extension of the movable tip section, means for effecting extension of the movable tip sections to cause extension and stressing the skin of the movable sections, and means for locking said tip sections in such position.

11. In a wing for aircraft having hollow longitudinal frame members receiving telescopically related cantilever spar elements carrying extensible wing tip portions secured thereto, means for supporting and for effecting telescopic movement of said extensible wing tip portions simultaneously, comprising strut members secured to the outer ends of said extensible wing tip portions and disposed in angular relation to the said cantilever spar elements, together with control mechanism secured in said wing and securing said strut members in shiftable engagement therewith, means for actuating said control mechanism to shift said strut members to cause telescopic movement of said extensible wing tip portions, and means to lock said strut members in extended position whereby said strut members and control mechanism cooperate with said cantilever spar elements to form shiftable truss framework for supporting said extensible wing tip portions.

12. In a wing for aircraft having hollow longitudinal frame members receiving telescopically related cantilever spar elements carrying extensible wing tip portions secured thereto, means for simultaneously supporting and causing telescopic movement of said extensible wing tip portions comprising strut members secured to the outer ends of said extensible wing tip portions together with a control shaft rotatably secured in said wing, and slidable shoes carried by fixed shoe guides, shiftably engaging said control shaft and secured to said strut members, means for rotating said control shaft to cause shiftable movement of said strut members and effect telescopic movement of said extensible wing tip portions, and lock said strut members in extended position whereby said strut members, control shaft, slidable shoes and fixed shoe guides cooperatively form with said cantilever spar elements trussed framework for supporting said extensible wing tip portions.

13. In a wing for aircraft having hollow longitudinal frame members receiving telescopically related cantilever spar elements carrying extensible wing tip portions secured thereto, control means for causing telescopic movement of said extensible wing tip portions which includes shiftable struts secured to the outer ends of said wing tip portions and disposed in angular relation to the said cantilever spar elements, means for locking said struts in wing tip extended position whereby said control means and struts cooperatively truss the outer ends of said cantilever spar elements and thereby convert said cantilever elements into beam elements.

14. A unit for aircraft wing construction comprising a metal skin member shaped to form an aerofoil section with an outwardly extending marginal flange disposed at one side thereof, and an inwardly extending marginal flange disposed at the opposite side thereof, the free edges of said flanges bent inwardly towards each other, and rib supporting means secured to said section at the outwardly extending flange side thereof.

15. A unit for aircraft wing construction comprising a metal skin member shaped to form an aerofoil section with outwardly and inwardly extending marginal flanges disposed at opposite sides respectively, the free edges of said flanges bent inwardly towards each other, a rib support secured to said section at the outwardly extending flange side thereof, and means attachable to said rib support for slidably securing said unit to supporting frame elements.

16. Aircraft wing construction comprising a series of movable units shaped to form aerofoil sections telescopically nestable together, said sections having outwardly extending marginal flanges disposed at adjacent sides, and inwardly extending marginal flanges disposed at the opposite sides, the free edges of said flanges being bent inwardly towards each other, whereby extension of said movable units effects inter-engagement of the inwardly and outwardly extending flanges of adjacent sections.

17. Aircraft wing construction comprising a series of movable units shaped to form aerofoil sections adapted to fit one within another in a graduated series, said sections having outwardly extending marginal flanges together with rib supports disposed at similar sides, and inwardly extending marginal flanges disposed at the opposite and unsupported sides, the free edges of said flanges being bent inwardly towards each other, whereby extension of said movable units causes the successive inter-engagement of the inwardly and outwardly extending flanges of adjacent sections and disposes said rib supports at the respective unsupported sides, and retraction of said movable units successively abuts the rib supports of adjacent sections and effects inter-fitting of said movable units thereby.

18. In a wing for aircraft having hollow longitudinal frame members, extensible wing tip portions, each comprising a fixed exterior section and a plurality of movable sections including a movable tip section, all said movable sections arranged to fit one within another within said fixed exterior section, cantilever spar elements secured to said tip section, slidably engaging the other sections and disposed in telescopic relation to the said wing frame members, said sections having inter-fitting telescopic joints successively inter-engaging upon extension of the tip section, means for effecting extension of the movable tip sections to cause extension of the other movable sections to a position where the telescopic joints of all said sections inter-engage and thereby arrest further extension of said movable sections, whereby the skin surfaces of said fixed and movable sections are held under tensional stress by the said means.

KENNETH L. HAYDEN.

CERTIFICATE OF CORRECTION.

Patent No. 2,056,188. October 6, 1936.

KENNETH L. HAYDEN.

It is hereby certified that error appears in the printed specification of the above numbered patent requiring correction as follows: Page 8, first column, line 44-45, claim 15, strike out "comstruction"; and that the said Letters Patent should be read with this correction therein that the same may conform to the record of the case in the Patent Office.

Signed and sealed this 8th day of December A. D. 1936.

Henry Van Arsdale (Seal) Acting Commissioner of Patents,